United States Patent

[11] 3,534,813

[72] Inventor Robert B. Fleming
Scotia, New York

[21] Appl. No. 806,064
[22] Filed March 11, 1969
[45] Patented Oct. 20, 1970
[73] Assignee General Electric Company
a corporation of New York

[54] HEAT EXCHANGER
5 Claims, 6 Drawing Figs.

[52] U.S. Cl. .......... 165/164, 62/6
[51] Int. Cl. .......... F28d 9/00
[50] Field of Search .......... 165/4, 10, 135, 164, 167, 165; 62/6

*Primary Examiner*—Robert A. O'Leary
*Assistant Examiner*—Theophil W. Streule
*Attorneys*—Paul A. Frank, John F. Ahern, Julius J. Zaskalicky, Frank L. Neuhauser, Oscar B. Waddell and Joseph B. Forman

ABSTRACT: Misalignment of the holes in adjacent plates in a parallel perforated plate heat exchanger is achieved by use of identical plates. Each of the parallel plates includes a plurality of parallel rows of holes. The spacing between adjacent holes in each of the rows is identical and the spacing of the holes of adjacent rows is such that a hole in one row forms with two adjacent holes in an adjacent row an equilateral triangle. When two such plates lie in parallel planes and a row in one plate is angularly displaced by 30° from a corresponding row in the other plate, a maximum misalignment is produced.

Inventor:
Robert B. Fleming,
by Julius J. Zaskalicky
His Attorney.

Inventor:
Robert B. Fleming,
by [signature]
His Attorney.

Patented Oct. 20, 1970 3,534,813

Inventor:
Robert B. Fleming,
by Julius J. Zaskalicky
His Attorney.

HEAT EXCHANGER

The present invention relates to heat transfer devices such as heat exchangers and regenerators which make use of stacked perforated plates to effect heat transfer between streams or regions of the heat transfer devices. The present invention is particularly directed to such structures in which misalignment of the perforations in adjacent plates is provided to achieve good heat transfer between channels or regions of the devices.

In a copending patent application Ser. No. 641,918 filed May 29, 1967, now Pat. No. 3,477,504 granted Nov. 11, 1969 and assigned to the assignee of the present invention, there is disclosed and claimed a perforated plate counterflow heat exchanger particularly useful in cryogenic refrigeration systems. The heat exchanger is provided with a plurality of high conductivity perforated plates spaced from one another by a plurality of low conductivity separators or spacers to form with the plates a pair of channels each for receiving a respective counterflowing fluid stream. Misalignment of the perforations or holes in adjacent plates causes the streams to flow in tortuous paths. Accordingly, hydrodynamic and thermal boundary layers formed are broken up at each plate. Such action results in higher heat transfer rates than if the flow were to progress from one plate to the next without bending or turning. In the aforementioned perforated plate heat exchanger a problem arises in the production of either an alignment or misalignment in the holes in plates. As the holes are very small, for example, of the order of 10 mils (a mil is one-thousandth of an inch) in diameter, it becomes difficult to position the plates during fabrication in such a way as to assure misalignment of the holes. For example, if two rectangular plates with such small holes are placed on top of one another and the holes are aligned the plates can be misaligned by moving the top plate to the left or right only one half the distance between the holes. With such small distances between the holes it becomes very difficult in production either to align or misalign the holes consistently. It is difficult even were two separate designs of plates formed with the requisite spacing of holes to produce misalignment between the two designs when interleaved and registered.

Accordingly, an object of the present invention is to provide a simple means for achieving misalignment of holes in a pair of perforated plates.

Another object of the present invention is to provide a means for achieving maximum misalignment of holes in a pair of identical adjacent perforated plates.

It is a further object of the present invention to provide a heat transfer device employing perforated plates in which adjacent plates have holes which are misaligned and in which such plates can be identical in structure thereby simplifying the manufacture and assembly thereof and concurrently providing a structure in which the holes of the adjacent plates are maximally misaligned.

In accordance with an illustrative embodiment of the present invention, as applied to a heat exchanger, identical perforated plates are provided. Each of the plates includes a plurality of parallel rows of holes. The spacing between adjacent holes in each of the rows is identical and the spacing of the holes of adjacent rows is such that a hole in one row forms with two adjacent holes in an adjacent row an equilateral triangle. When two such plates lie in parallel planes adjacent to one another and a row in one plate is angularly displaced by 30° from a corresponding row in the other plate, a maximum misalignment pattern is produced. Lateral movement of such plates with respect to one another does not change the pattern size, that is, the restricted flow through the two plates is not altered. In rectangular configurations, the desired 30° displacement or an odd multiple thereof such as 90° or 150° between corresponding rows in adjacent plates can also be achieved by use of identically formed plates. The rows of holes are aligned at an angle of 45° to a side of the rectangular plate. Rotation of the plate through an angle of 180° about an axis parallel to one side produces an alignment in which the rows are 135° with respect to the original side. When two such plates are stacked adjacent to one another, one in the original position and one in the rotated position, the angles between corresponding rows is the difference between 135° and 45°, or 90°. Accordingly, maximum misalignment is achieved.

The novel features which are believed to be characteristic of the present invention are set forth in the appended claims. The invention itself, however, together with further objects and advantages thereof may best be understood by reference to the following description taken in connection with the accompanying drawings wherein:

Figure 1:
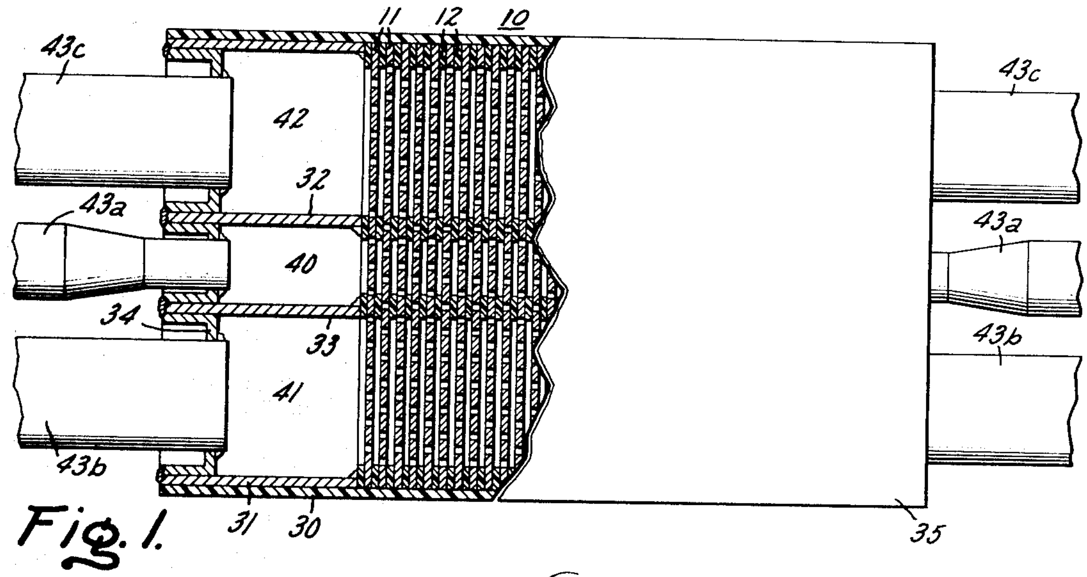
FIG. 1 is a plan view, partly in section, showing a heat exchanger incorporating the present invention.
Figure 2:
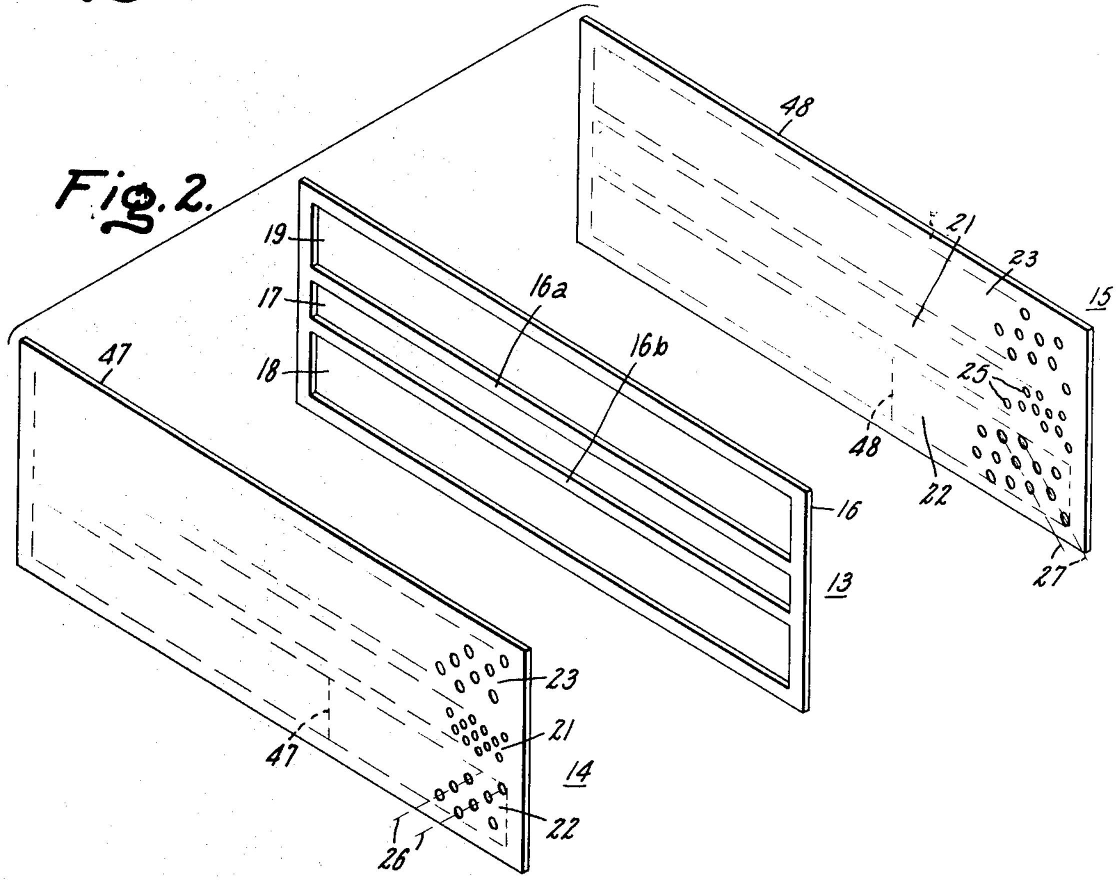
FIG. 2 shows an exploded view in perspective of a pair of perforated plates separated by a separator such as would be used in the embodiment of FIG. 1.

Referring now to FIG. 1, there is shown a heat exchanger 10 including a plurality of high conductivity perforated plates 11 and a plurality of low conductivity spacers 12. A single spacer 13 and a pair of adjacent plates 14 and 15 are shown in FIG. 2. The spacer has an enclosing rim portion 16 of rectangular outline and a pair of partition portions **16*a* and 16*b* extending between the short sides of the rim portion 16 to form three elongated openings 17, 18 and 19 in the spacer. Each of the plates 15 and 16 having elongated portions or areas 21, 22 and 23 thereon corresponding respectively to the elongated portions 17, 18 and 19 in the spacer. Each of the elongated portions 21, 22 and 23 on the plates 14 and 15 include a plurality of holes 25. All of the holes on plate 14 are aligned such that they form parallel rows 26 each row making an angle of 45° with the long dimension of the plate. The spacing of the holes 25 in each of rows being identical and each row being spaced from an adjacent row such that a hole in one row forms with the holes in two adjacent holes an equilateral triangle. Similarly, the holes 25 in each of the regions on the plate 15 are aligned into parallel rows 27, each row making an angle of 135° with the long dimension of the plate. The holes in each row are equally spaced from adjacent holes and the holes in one row are spaced from the holes in an adjacent row such that a hole in one row makes with two adjacent holes in an adjacent row an equilateral triangle. The plates 14 and 15** are preferably made identical. The manner in which identical plates can be aligned to provide the hole alignment such as shown in FIG. 2 will be explained in connection with FIG. 5.

The heat exchanger 10 of FIG. 1 includes a plurality of identical plates 11 separated by a plurality of spacers 12. The plurality of plates with hole alignment as shown in plate 14 are interleaved with a plurality of plates having a hole alignment as shown in plate 15. The plates in turn are interleaved with the spacers 12. The plates 11 can be made of aluminum and the holes therein can be formed by drilling, punching or etching or other suitable means. The spacer 11 can be made of a plastic material which readily bonds to aluminum. When the plates and the spacers are aligned such that the elongated openings 17, 18 and 19 and the elongated regions 21, 22 and 23 of the plates are aligned or in registry, three channels 40, 41 and 42 corresponding to the elongated openings 17, 18 and 19 of the spacers 12 are formed.

A headering structure is provided at each end of the heat exchanger. The header 30 includes a rectangular cup-shaped member 31 having a pair of partitions 32 and 33 formed in the base 34 thereof and extending along the sides such that when the header member 30 is attached to the end of the heat exchanger 10 the lip of the cup member 31 makes contact with the rim of the spacer or separator 13 of the heat exchanger and the lip of the partitions 32 and 33 make contact with the partition portions 16*a* and 16*b* of the separator, thereby providing a firm sealed contact thereto. The header 35 at the other end of the heat exchanger is similar to header 30. A plurality of ducts or ports 43*a*, 43*b* and 43*c* are provided at each end of the heat exchanger, each making connection with a respective one of the three channels 40, 41 and 42. The channel 40 may be a hot channel of a counterflow heat exchanger and the other two channels 41 and 42 may be interconnected to constitute the cold channel of the heat exchanger. With the arrangement of identical plates provided in the heat exchanger fluids flow through the heat exchanger in a tortuous path. With the arrangement of holes in the plates and the arrangement of plates provided, as illustrated in FIG. 3, a reliable misalignment of holes in adjacent plates is produced.

Figure 3:
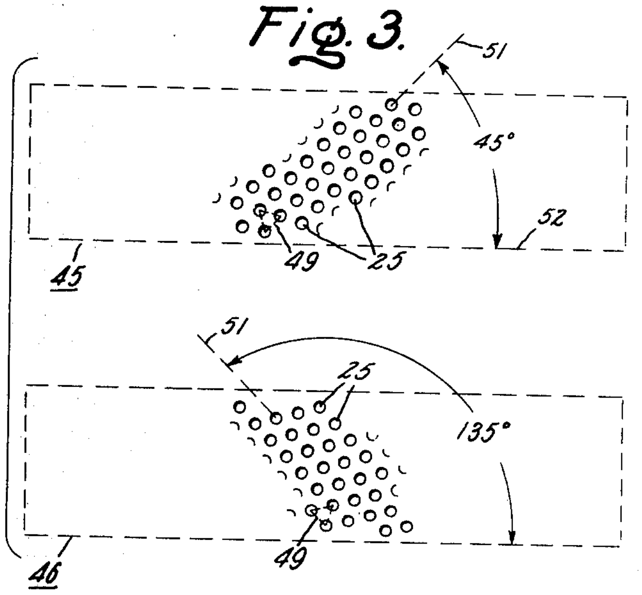
FIG. 3 shows sections of the perforated plates outlined in the dotted number boxes in FIG. 2 to show the relationship of the rows of the holes therein.
Figure 4:
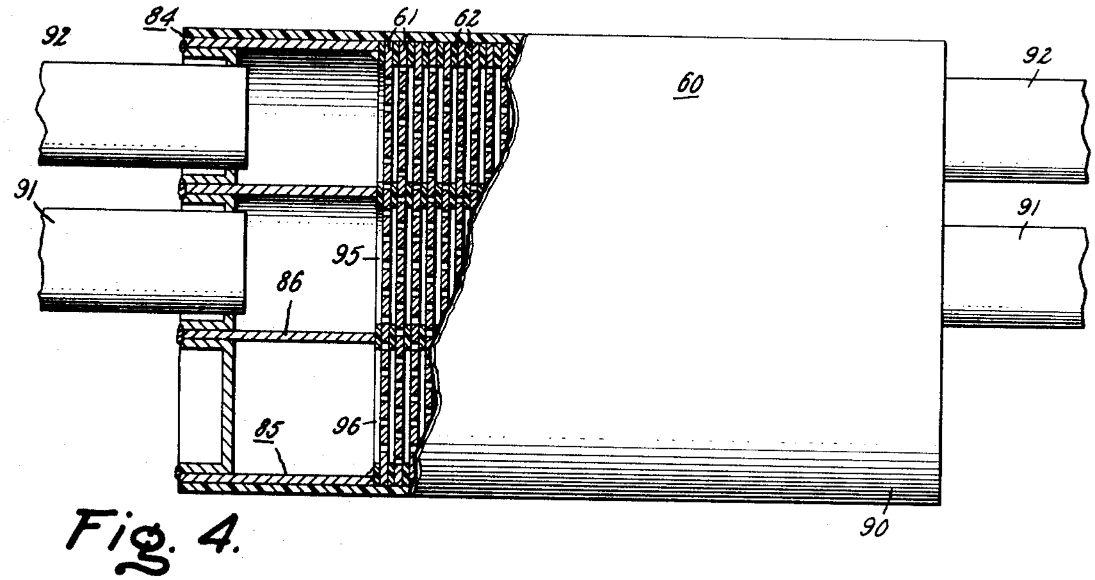
FIG. 4 shows a plan view, partly in section, of another embodiment incorporating the present invention in which the heat exchanger is circular in outline and incorporates circular perforated plates and spacers.
Figure 5:
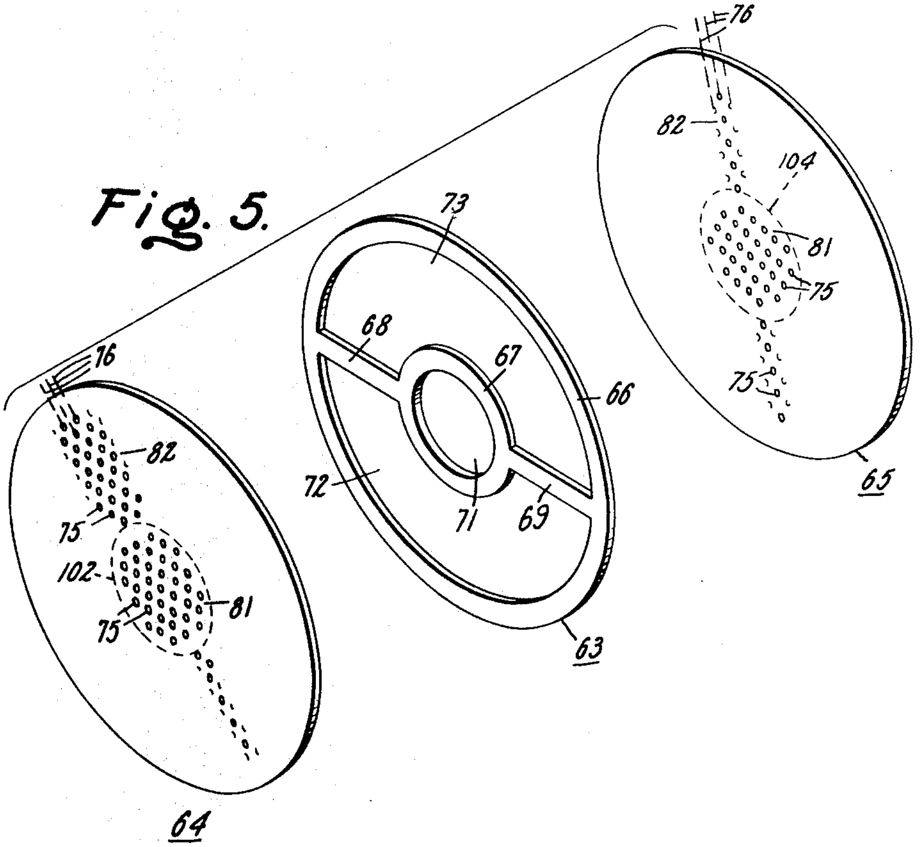
FIG. 5 shows an exploded view of a pair of perforated plates and a spacer, a plurality of which are used in the embodiment of FIG. 4.

Referring now to FIG. 3, there are shown spaced close to one another sections 45 and 46 of plates 14 and 15 of FIG. 2. The section 45 corresponds to the dotted portion 47 of plate 14 and section 46 corresponds to the dotted portion 48 of plate 15 of FIG. 2. The holes 25 in the sections of plates 45 and 46 are arranged in a plurality of parallel rows, each row making an angle of 45° with the long side of the rectangular section as indicated. The holes in each of the rows are equally spaced. The rows are spaced such that the center of a hole in one row forms an equilateral triangle with the centers of two adjacent holes in an adjacent row. One such equilateral triangle is indicated at 49. The row numbered 51 makes an angle of 45° with a line drawn from the intersection of the row with the bottom long side 52 of the rectangular and extending to the right. The section 46 is obtained by rotating section 45 180° about an axis parallel to the long sides of the section. Row 51 in section 46 makes an angle of 135° with respect to a line extending from the intersection of the row 51 with the long dimension of the rectangular section and extending to the right. Accordingly, the plates 14 and 15 can be identical and identically formed and the alignment of plate 14 with respect to plate 15 is achieved by rotating that plate 15 180° about an axis parallel to the long sides of the plate. Referring now to FIG. 4, there is shown another embodiment of a heat exchanger 60 including a plurality of high conductivity perforated plates 61 and a plurality of low conductivity spacers 62 of circular outline. A single spacer and a pair of adjacent plates 64 and 65 are shown in FIG. 5. The spacer 63 has an enclosing rim portion 66 of circular outline and a concentric circular inner rim 67 joined to the outer rim by a pair of partitions 68 and 69 to form three openings, a central opening 71 and two side openings 72 and 73. Each of the plates 64 and 65 having similar regions 81 and a concentric region 82 thereon corresponding, respectively, to the openings 71 and to the openings 72 and 73 in the spacer 63. Each of the portions 81 and 82 of plates 64 and 65 include a plurality of holes 75. All of the holes on plate 64 are aligned such that they form parallel rows 76. Thus spacing of the holes in each of the rows being identical and each row being spaced from an adjacent row such that a hole in one row forms an equilateral triangle with two adjacent holes in an adjacent row. Similarly, the holes in each of the regions on the plate 65 are aligned into parallel rows 76, each row making an angle of 30° or an odd multiple of 30° with a corresponding row in plate 64. The holes in each row are equally spaced from adjacent holes and the holes in one row are spaced from the holes in an adjacent row such that a hole in one row forms an equilateral triangle with two adjacent holes in an adjacent row. The plates 64 and 65 are preferably made identical. The manner in which identical plates can be aligned to provide an arrangement such as shown in FIG. 5 is by rotation of plate 65 30° from the position of the plate 64 about an axis through the plate.

The heat exchanger 60 of FIG. 4 includes a plurality of identical plates 61 separated by a plurality of spacers 62. The plurality of plates 61 with hole alignment shown in plate 64 are interleaved with a plurality of plates having the hole alignment as shown in plate 65. The plates 61 in turn are interleaved with the spacers 62. The plates 61 can be made of aluminum and the holes therein can be formed by drilling, punching or etching or other suitable means. The spacer can be made of a plastic material which readily bonds to aluminum. When the plates 61 and the spacers 62 are aligned such that the opening 71, and the openings 72 and 73 taken together of spacer 63 are aligned, two channels 95 and 96 corresponding, respectively, to the opening 71 and to the openings 72 and 73 taken together are formed. Of course, partitions 68 and 69 of adjacent spacers 62 would be nonaligned to permit movement of fluid throughout all parts of the outer channel 96.

A headering structure is provided at each end of the heat exchanger 60. The header 84 includes a circular cup-shaped member 85 having a concentric cylindrical partition 86 formed in the base thereof. When the header 84 is attached to the end of the heat exchanger the lip of the cup 85 makes contact with the rim of the separator 62 and the lip of the cylinder 86 makes contact with the partition portion 67 of the separator 62 thereby providing a firm sealed contact thereto. The header 90 at the other end of the heat exchanger is similar to header 84. A pair of ducts or ports 91 and 92 are provided at each end making connection with the two channels 95 and 96 corresponding to opening 71 and openings 72 and 73 of spacer 63. The channel 95 may be one channel of a counterflow heat exchanger and the other channel 96 can be the other channel thereof. With the arrangement of identical plates provided as described above in the heat exchanger the flow of fluids through the heat exchanger are caused to pass through a bending or weaving path.

Figure 6:
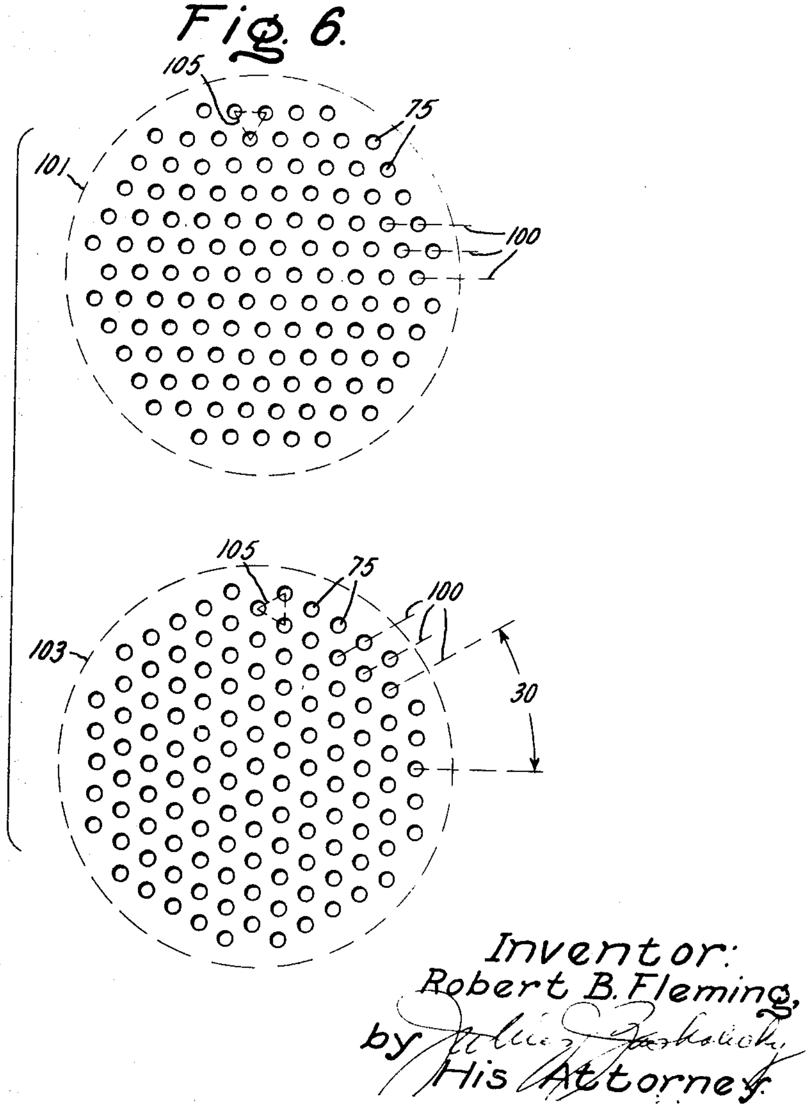
FIG. 6 shows sections of the perforated plates outlined in dotted circles in FIG. 5 to show the relationship of the rows of the holes therein.

Referring now to FIG. 6, there is shown spaced close to one another sections of plates 64 and 65 of FIG. 5. The section 101 corresponds to the dotted portion 102 of plate 64 and section 103 corresponds to the dotted portion 104 of plate in FIG. 5. The holes 75 in the sections of plates are arranged in a plurality of parallel rows 100. The holes in each of the rows are equally spaced. The rows are spaced such that the center of a hole in one row forms an equilateral triangle with the centers of two adjacent holes in an adjacent row. The equilateral triangle is indicated in dotted form at 105. Misalignment in the identical sections 101 and 103 is accomplished simply by a rotation of 30°, or an odd multiple thereof, of section 103 about an axis perpendicular to the plane of the plate.

The perforations 75 are of a diameter and spaced from adjacent perforations in a plate to provide good heat flow in the plates between channels. Preferably, all of the holes 75 are of the same diameter although the diameters could be varied while keeping the centers of holes of each row equally spaced and the rows spaced to maintain the equilateral triangle relationship between a center of a hole in one row with respect to two adjacent centers in an adjacent row.

While the invention has been described in specific embodiments, it will be appreciated that many modifications may be made by those skilled in the art and I intend by the appended claims to cover all such modifications and changes as fall within the true spirit and scope of the invention.

I claim:

1. A heat exchange device for transferring heat between two regions thereof comprising:

a plurality of high conductivity perforated plates; and a plurality of low conductivity separators, each separator interposed between and in contact with adjacent ones of said plates, each of said separators having an enclosing rim portion and a partition portion extending between and integral with parts of said rim portion, said spacers being aligned to provide a pair of channels each corresponding to a respective one of said channels, each of said perforated plates including a plurality of rows of holes having their centers lying on equally spaced parallel lines, the holes in each row being equally spaced from one another, the hole in one row forming an equilateral triangle with two adjacent holes in an adjacent row, a row in one plate being rotated by an odd multiple of 30° from a corresponding row of holes in an adjacent plate, whereby the holes in one plate are maximally misaligned from holes in an adjacent plate.

2. The combination of claim 1 in which each of said separators is oblong in outline having a long dimension and a short dimension at right angles thereto and bonded to adjacent ones of said plates, said plates being rectangular in outline, said rows of holes in each of said porous plates oriented at an angle of 45° with respect to one side of a side of each of said plates and oriented at an angle of 135° with respect to the other side of said side of each of said plates, said plurality of plates being stacked such that said one side of a plate registers with said other side of adjacent plates.

3. The combination of claim 1 in which each of said separators is circular in outline and in which each of said plates are circular in outline and in which corresponding rows of adjacent plates are displaced by 30° from one another.

4. The combination of claim 1 in which each of said perforated holes is of the same diameter.

5. The combination of claim 1 in which a side of said equilateral triangle is twice the diameter of a hole.